US 8,255,010 B2

(12) United States Patent
Cheng et al.

(10) Patent No.: US 8,255,010 B2
(45) Date of Patent: Aug. 28, 2012

(54) METHODS AND SYSTEMS FOR STATE-DRIVEN POWER SAVINGS FOR WIMAX

(75) Inventors: Steven Cheng, San Diego, CA (US); Guangming Carl Shi, San Diego, CA (US); Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 783 days.

(21) Appl. No.: 12/211,910

(22) Filed: Sep. 17, 2008

(65) Prior Publication Data
US 2010/0069128 A1 Mar. 18, 2010

(51) Int. Cl.
*H04M 1/00* (2006.01)
(52) U.S. Cl. ......... 455/574; 370/311; 370/318; 713/322
(58) Field of Classification Search ............ 455/574; 370/310, 318; 377/311
See application file for complete search history.

(56) References Cited

U.S. PATENT DOCUMENTS
6,564,074 B2 *  5/2003  Romans .................. 455/574
7,073,079 B1    7/2006  Karsi et al.
7,454,634 B1 * 11/2008  Donovan et al. .......... 713/322
7,640,446 B1 * 12/2009  Donovan .................. 713/322
2004/0255176 A1 12/2004  George et al.

FOREIGN PATENT DOCUMENTS
WO  WO0229535 A2  4/2002

OTHER PUBLICATIONS
International Preliminary Report on Patentability—PCT/US2009/057000, The International Bureau of WIPO—Geneva, Switzerland, Jan. 10, 2011.

* cited by examiner

*Primary Examiner* — Nay A Maung
*Assistant Examiner* — Chung-Tien Yang
(74) *Attorney, Agent, or Firm* — Tyler Overall

(57) ABSTRACT

Methods and apparatus for conserving battery power in a mobile device for wireless communication by dynamically adjusting the clock frequency and/or the voltage of the device's processor according to the Media Access Control (MAC) layer state are provided. By using a higher clock frequency and/or a higher voltage for a normal operation state with large amounts of data traffic and lower clock frequencies and/or lower voltages for other MAC layer states (e.g., acquisition, network entry, and sleep/idle states), battery power may be conserved, thereby extending the time in which the device may operate between battery charging cycles.

28 Claims, 6 Drawing Sheets

METHODS AND SYSTEMS FOR STATE-DRIVEN POWER SAVINGS FOR WIMAX

TECHNICAL FIELD

Certain embodiments of the present disclosure generally relate to wireless communication and, more particularly, to conserving battery power in a mobile device.

BACKGROUND

OFDM and OFDMA wireless communication systems under IEEE 802.16 (WiMAX) use a network of base stations to communicate with wireless devices (i.e., mobile stations) registered for services in the systems based on the orthogonality of frequencies of multiple subcarriers. Such wireless systems can be implemented to achieve a number of technical advantages for wideband wireless communications, such as resistance to multipath fading and interference. Each base station (BS) emits and receives radio frequency (RF) signals that convey data to and from the mobile stations (MSs).

Generally, batteries provide power for most mobile stations, and therefore, power consumption is a concern for MS design engineers. In an MS operating with WiMAX, battery consumption becomes more critical since WiMAX has the potential to send and receive data in the hundreds of megabits per second (Mbps) range. Thus, a WiMAX MS may consume more power than traditional 2G and 3G wireless devices.

SUMMARY

Certain embodiments of the present disclosure generally relate to saving battery power in a mobile device by dynamically adjusting the clock frequency and/or the voltage of the device's processor according to the Media Access Control (MAC) layer state.

Certain embodiments of the present disclosure provide a method for saving power in a mobile device having a processor. The method generally includes operating the processor with a clock frequency and a voltage according to a first MAC layer state, transitioning to a second MAC layer state, and adjusting at least one of the clock frequency or the voltage of the processor according to the second state.

Certain embodiments of the present disclosure provide a computer-program product for saving power in a mobile device for wireless communication having a processor. The computer-program product typically includes a computer-readable medium having instructions stored thereon, the instructions being executable by one or more processors. The instructions generally include instructions for operating the processor with a clock frequency and a voltage when the mobile device is in a first MAC layer state, instructions for transitioning to a second MAC layer state, and instructions for adjusting at least one of the clock frequency and the voltage of the processor when the mobile device is in the second state.

Certain embodiments of the present disclosure provide an apparatus for wireless communication. The apparatus generally includes a processor, means for operating the processor with a clock frequency and a voltage when the mobile device is in a first MAC layer state, means for transitioning to a second MAC layer state, and means for adjusting at least one of the clock frequency and the voltage of the processor when the mobile device is in the second state.

Certain embodiments of the present disclosure provide a mobile device. The mobile device generally includes a processor, control logic configured to operate the processor with a clock frequency and a voltage when the mobile device is in a first MAC layer state, and state logic configured to transition to a second MAC layer state, wherein the control logic is configured to adjust at least one of the clock frequency and the voltage of the processor when the mobile device is in the second state.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
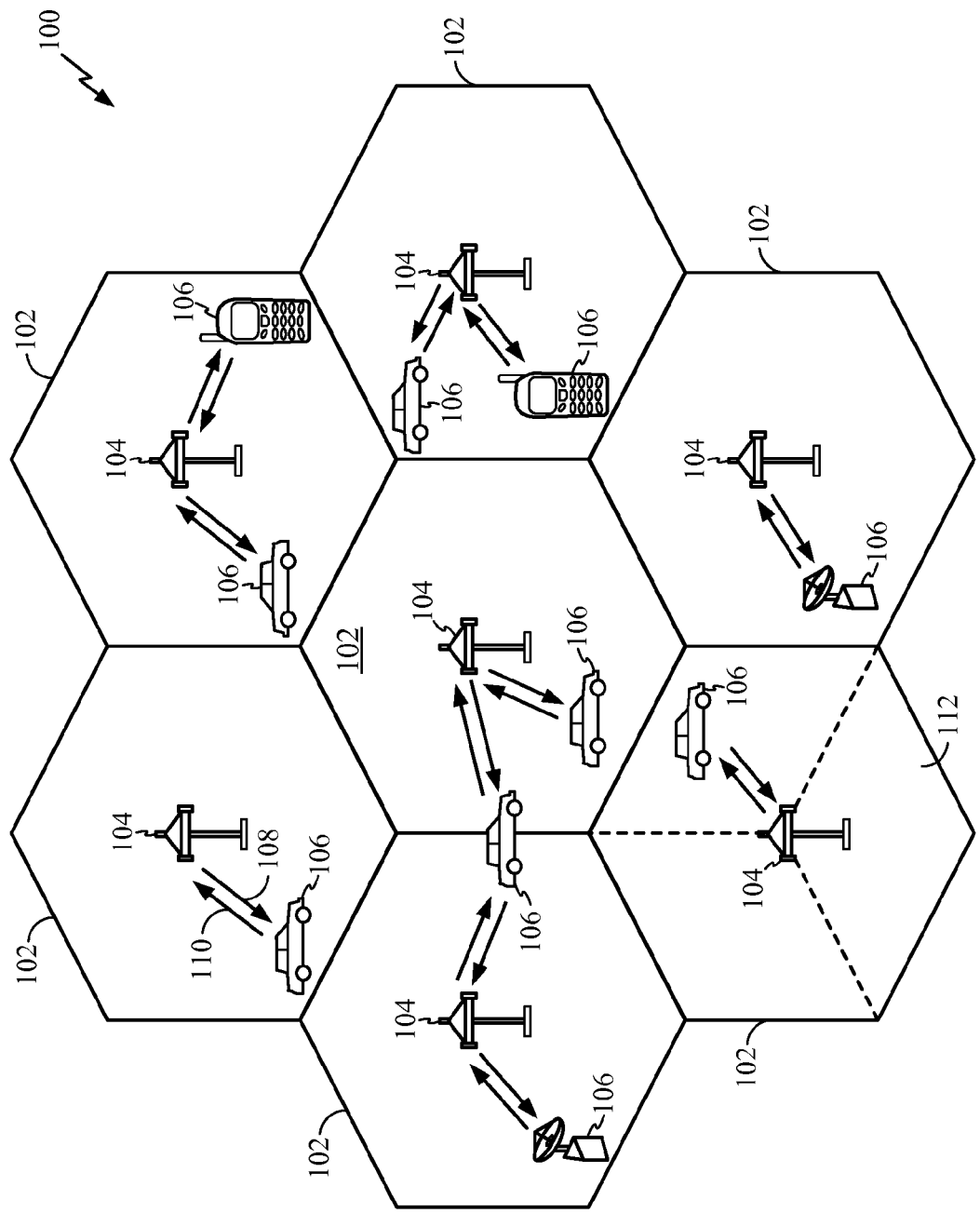
FIG. 1 illustrates an example wireless communication system, in accordance with certain embodiments of the present disclosure.

Certain embodiments of the present disclosure provide techniques and apparatus for conserving battery power in a mobile device for wireless communication by dynamically adjusting the clock frequency and/or the voltage of the device's processor according to the Media Access Control (MAC) layer state. By using a higher clock frequency and/or a higher voltage for a normal operation state with large amounts of data traffic and lower clock frequencies and/or lower voltages for other MAC layer states (e.g., acquisition, network entry, and sleep/idle states), battery power may be conserved, thereby extending the time in which the device may operate between battery charging cycles.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station (BS) 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
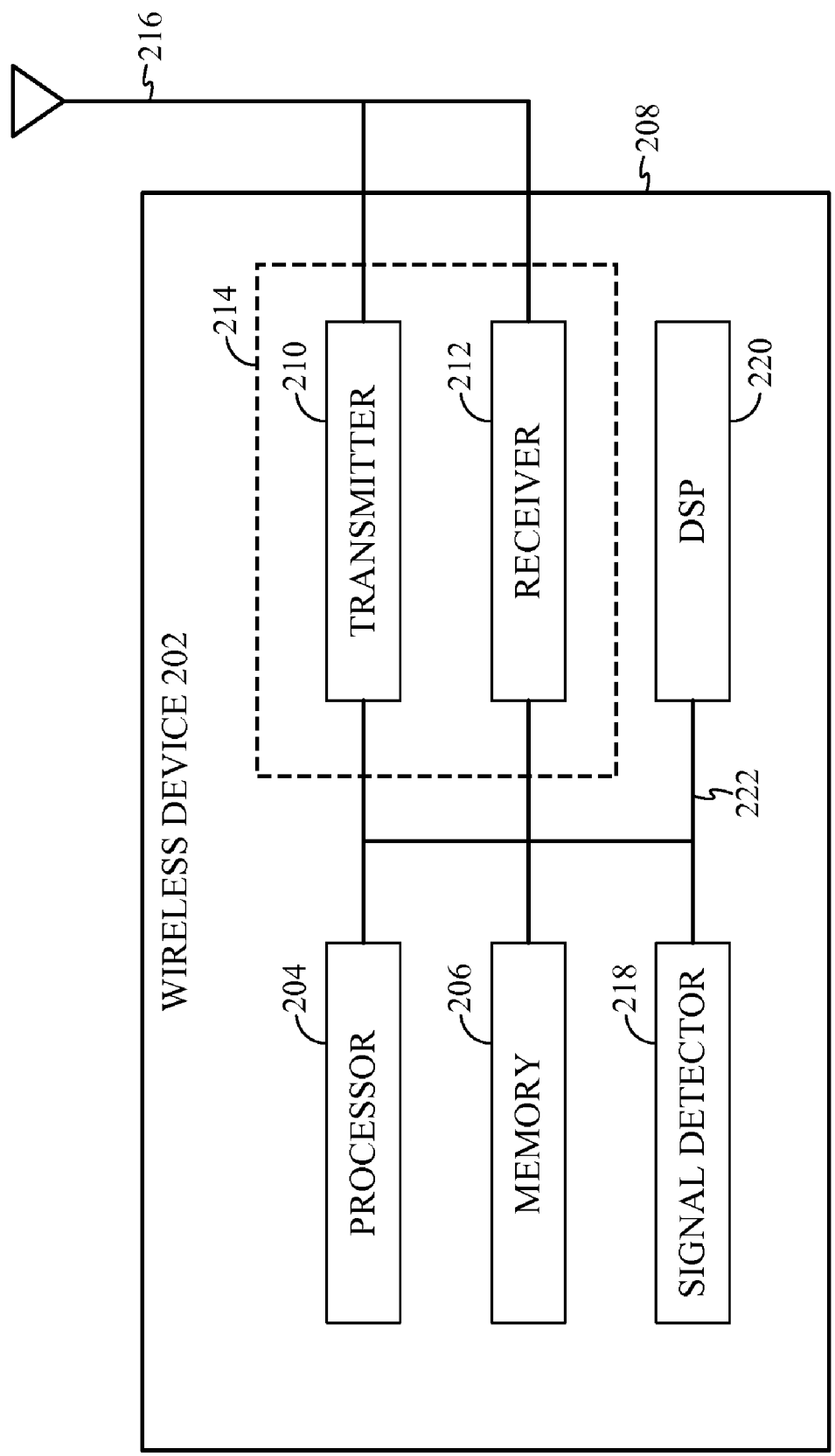
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). The processor may include a clock 205 with an adjustable frequency, and for some embodiments, the processor may have an adjustable supplied power voltage or an adjustable internal voltage.

Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
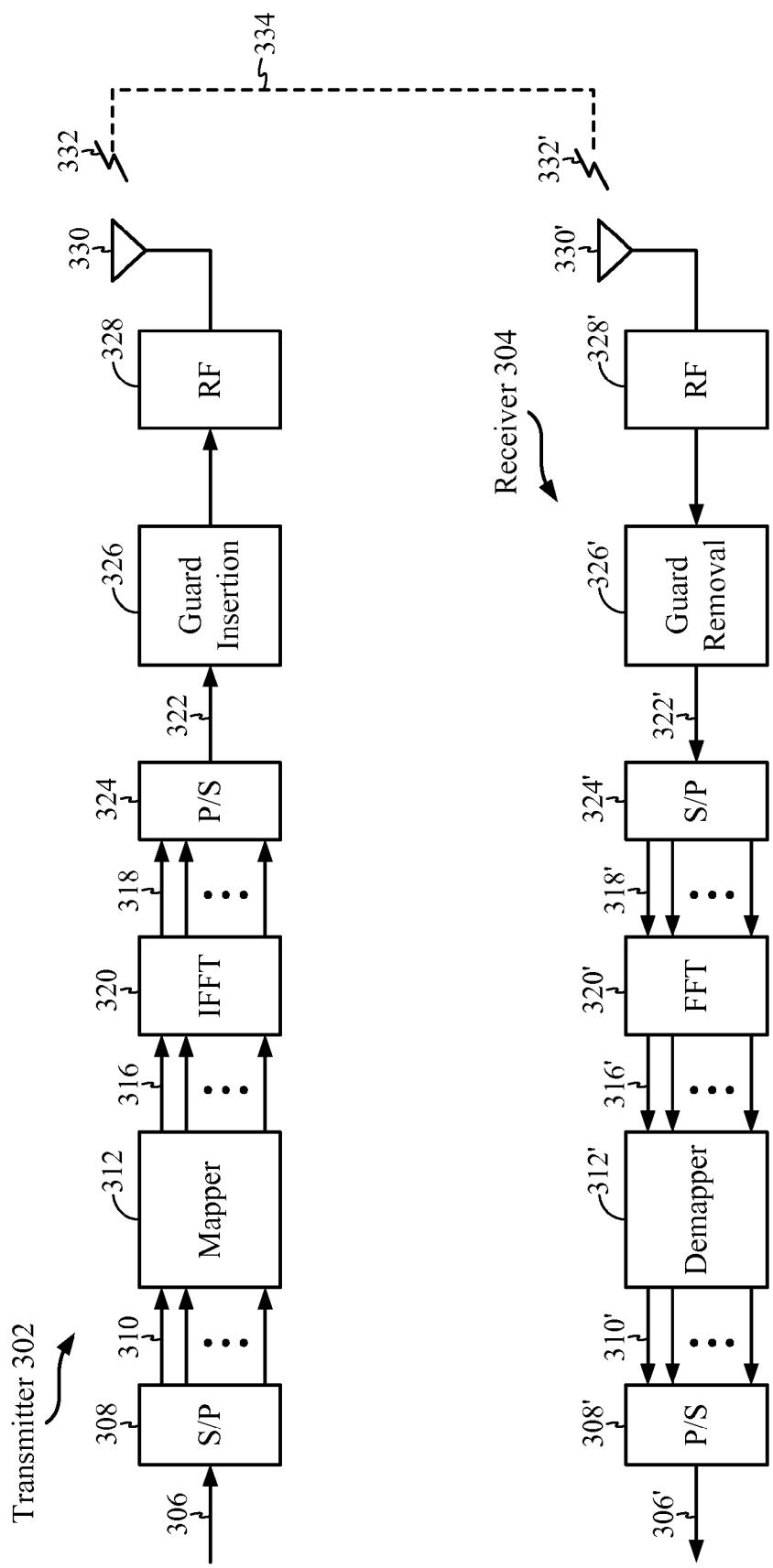
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary MAC Layer State Machine

Figure 4:
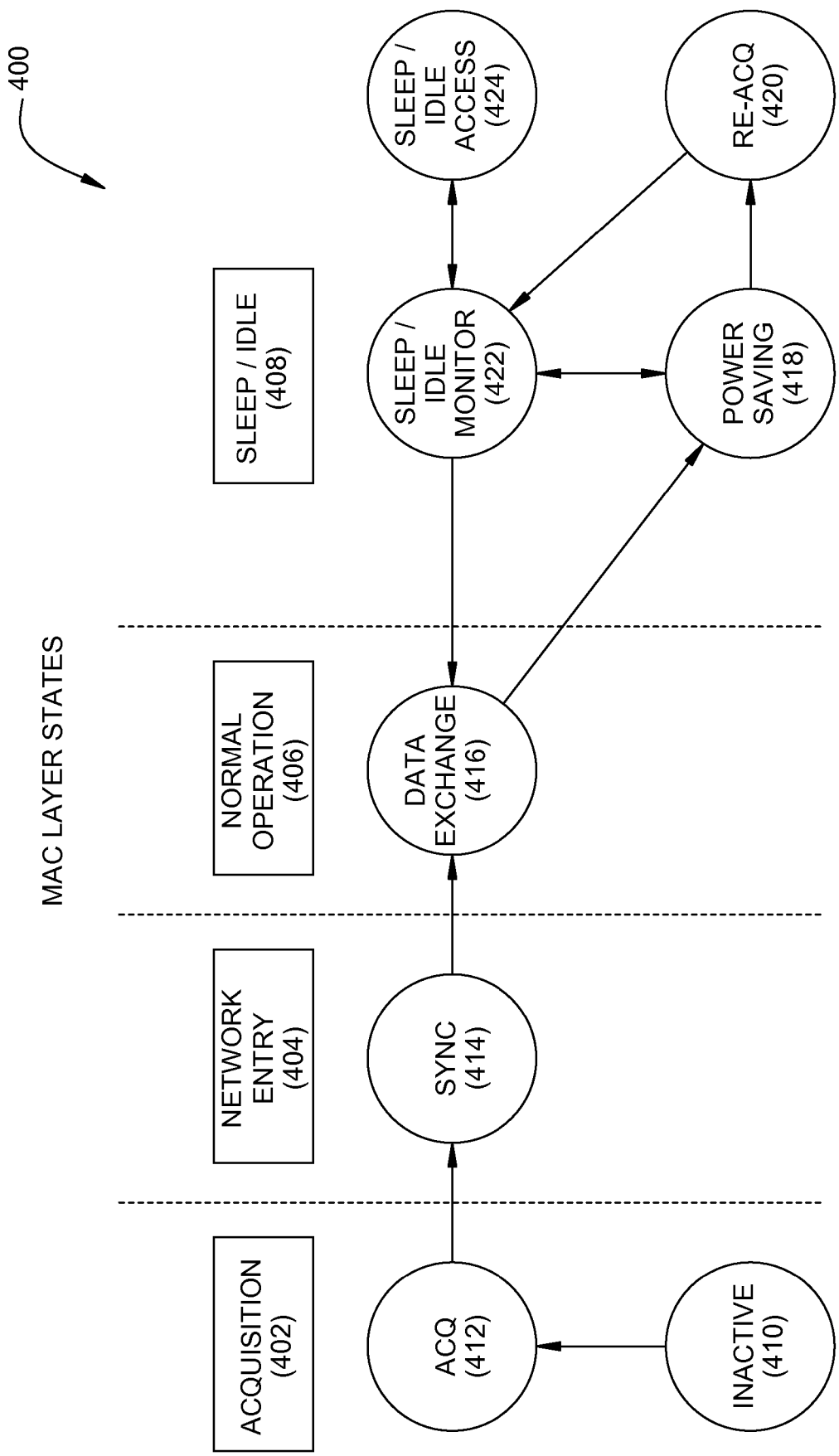
FIG. 4 illustrates various Media Access Control (MAC) layer states in an example MAC layer state machine for WiMAX, in accordance with certain embodiments of the present disclosure.

FIG. 4 illustrates various Media Access Control (MAC) layer states in an example MAC layer state machine 400 for WiMAX, in accordance with certain embodiments of the present disclosure. As depicted in FIG. 4, the MAC layer states may be divided into four categories: acquisition 402, network entry 404, normal operation 406, and sleep/idle 408.

Initially, a mobile station (MS) may enter into a WiMAX network in an inactive state 410. After the MS powers up its receiver circuitry, the MS may enter an acquisition state 412. In the acquisition state 412, the MS may listen for broadcast signals from a base station 104 and try to acquire the base station with the clearest signals (e.g., signals with the least channel-to-interference-plus-noise ratio, or CINR).

Once the MS has acquired a base station, the MS may enter a synchronization state 414 as part of the network entry category 404. During the synchronization state 414, the MS may search for certain downlink parameters, such as DL-MAP MAC management messages. The MS has achieved MAC synchronization once it has received at least one DL-MAP message and is able to decode the DL burst profiles contained therein. Following synchronization, the MS may register and may negotiate basic capabilities with the base station 104.

After the MS has satisfied conditions for entering the WiMAX network, the MS may begin receiving data from and transmitting data to the BS in the data exchange state 416 of normal operation 406. In the data exchange state 416, the MS may send or receive data at hundreds of megabits per second (Mbps).

If there is no data available for the MS for a certain amount of time or if the MS transmits a De-Registration Request (DREG-REQ) message to its serving base station, the MS may transition to a power-saving state 418 where the MS enters a sleep mode or an idle mode. Once in the power-saving state 418, the MS may temporarily change to a sleep/idle monitor state 422 in an effort to listen for DL signals, such as the Downlink Channel Descriptor (DCD). If the MS expects a Traffic Indication (TRF-IND)/Page Advertisement (PAG-ADV) message, the MS may transition to the sleep/idle access state 424 in an effort to receive a traffic indication/page from the BS, informing the MS wake up from the sleep/idle mode, for example, and return to normal operation in the data exchange state 416.

If the MS does not receive any DL signals during the sleep/idle monitor state 422, the MS may return to the power-saving state 418. Eventually, the MS may enter a re-acquisition state 420 in an effort to reacquire the WiMAX network from the serving base station or from a neighbor base station. After the re-acquisition state 420, the MS may enter the sleep/idle monitor state 422 to listen for the DL signals from its current serving base station.

Exemplary State-Driven Power Savings Techniques

Because only the data exchange state 416 of the normal operation category 406 demands running the processor at a high clock frequency and a relatively high voltage, the MS need not operate the processor at this high clock frequency and high voltage for other MAC layer states (e.g., power-saving state 418). Therefore, the processor may employ a lower clock frequency and/or a lower voltage when operating in states other than the data exchange state 416. By dynamically and intelligently adjusting the processor clock frequency and/or operating voltage as the MS transitions from one MAC layer state to another, the mobile device may conserve battery power.

Figure 5:
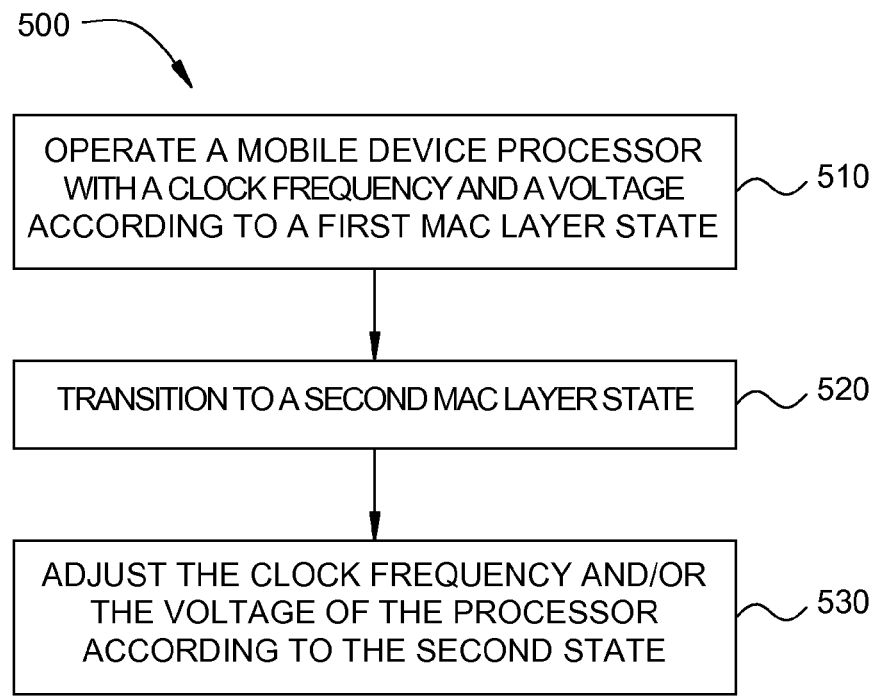
FIG. 5 illustrates a flow diagram of example operations for saving power in a mobile device by dynamically adjusting the clock frequency and/or the voltage of the device's processor according to the MAC layer state, in accordance with certain embodiments of the present disclosure.

FIG. 5 illustrates example operations 500 for saving power in a mobile device by dynamically adjusting the clock frequency and/or the voltage of the device's processor according to the MAC layer state. The operations 500 begin, at 510, by operating the mobile device processor, such as the processor 204 of the wireless device 202, at a certain clock frequency and a certain voltage according to the current MAC layer state.

At 520, the MS may transition to a different MAC layer state. For example, the MS may transition from one MAC state to another MAC state according to the MAC layer state machine 400 described with respect to FIG. 4 above. In a first example, the MS may transition from the data exchange state 416 of the normal operation category 406 to the power-saving state 418 in the sleep/idle mode category 408. In a second example, the MS may transition from the synchronization state 414 in the network entry category 404 to the data exchange state 416.

At 530, the MS may adjust the processor's clock frequency, operating voltage, or both according to the new MAC layer state in an effort to save battery power while still providing at least the maximum data rate corresponding to the new state. In the first example of the preceding paragraph, the dynamic-scaling-supporting processor may decrease the clock frequency and/or decrease the processor voltage during or after transitioning from the data exchange state 416 to the power-saving state 418. In the second example, the MS may increase the clock frequency and/or increase the processor voltage in response to transitioning from the synchronization state 414 to the data exchange state 416. Only the data exchange state 416 may entail using the highest clock frequency supported for the processor, as described above.

For some embodiments, the processor may determine what clock frequency or operating voltage to use based on a look-up table that indicates the desired clock frequency and/or operating voltage for a given MAC layer state or category (e.g., categories 402, 404, 406, and 408). The look-up table may be stored internal to the processor 204 or in memory 206 external to the processor. For other embodiments, the processor may determine the clock frequency or operating voltage based on whether the MS is operating in a MAC layer state in the normal operation category 406 or not, rather than scaling the clock frequency and/or voltage for various MAC layer states and categories. Furthermore, using the MAC manager state transition as the trigger to dynamically reconfigure the modem processor may expend almost no overhead in software.

Figure 6:
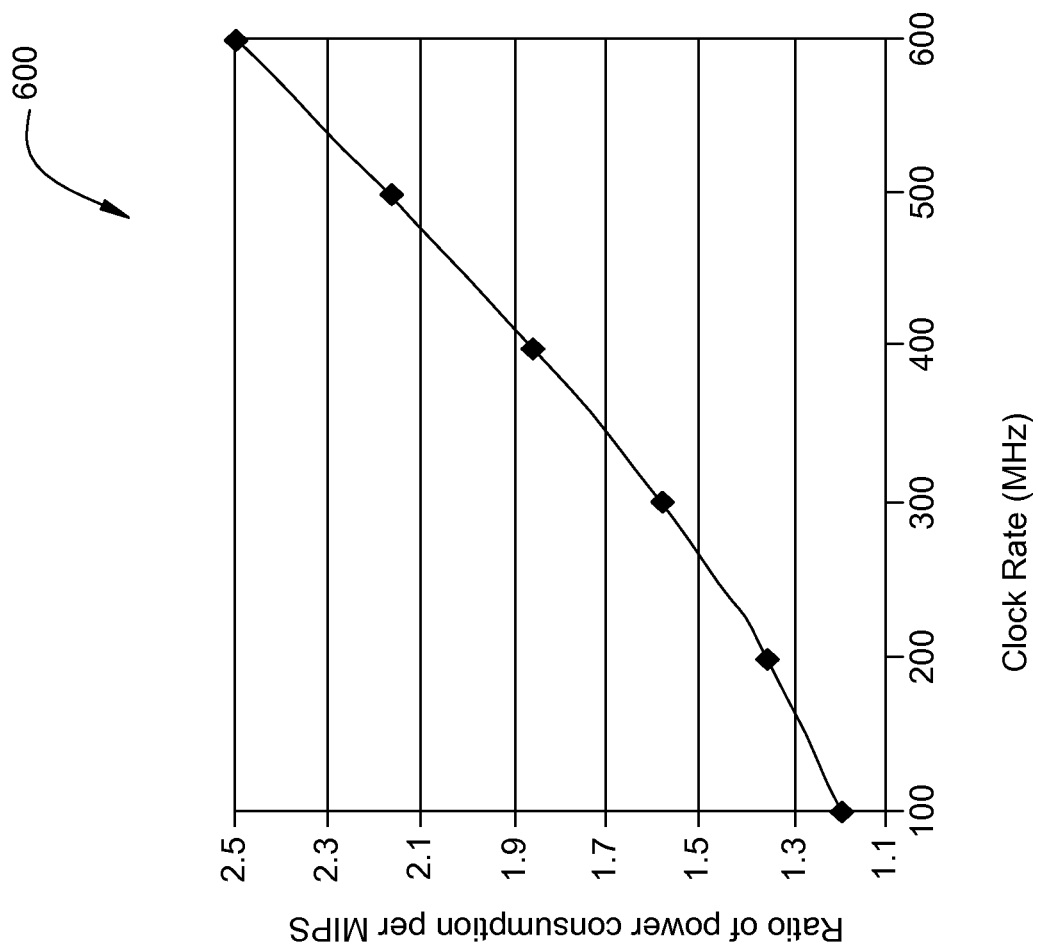
FIG. 6 is an example graph illustrating the ratio of power consumption per MIPS versus the processor clock frequency, in accordance with certain embodiments of the present disclosure.

FIG. 6 is an example graph 600 illustrating the ratio of power consumption per MIPS (million instructions per second) versus the clock frequency of the processor. Generally, the power consumption per MIPS ratio increases as the clock rate increases. As described above, the processor may only operate with high speed transmission and receiving operations, which involve substantial MIPS, in the data exchange state 416 of the normal operation category 406. In other MAC layer states or categories, the MS processor need not operate with such significant MIPS consumption and high clock speed. As long as the processor can provide the maximum MIPS corresponding to any one of the other categories (acquisition 402, network entry 404, and sleep/idle 408), the processor may run with a slower clock speed when in one of the MAC layer states of these other categories.

Looking at the graph 600 of FIG. 6, if the clock rate is reduced from 600 MHz to 300 MHz, the power consumption per MIPS ratio may be decreased at least 36%. Likewise, the power consumption per MIPS ratio may drop at least 52% if the clock rate is reduced from 600 MHz to 100 MHz.

Figure 5A:
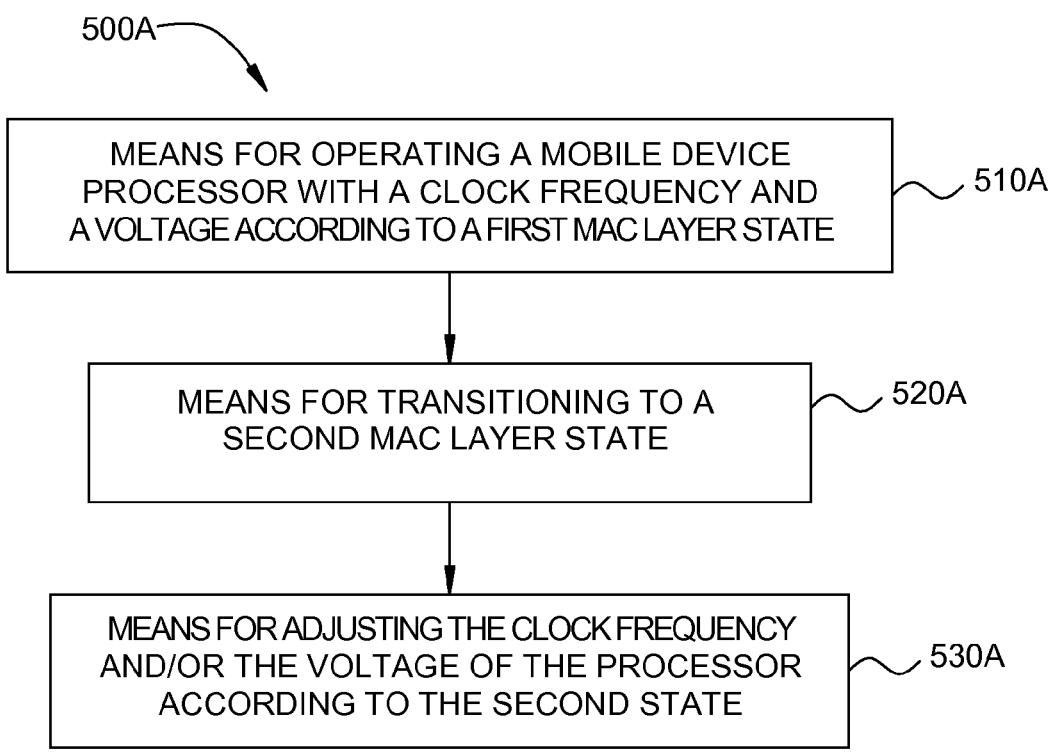
FIG. 5A is a block diagram of means corresponding to the example operations of FIG. 5 for saving power, in accordance with certain embodiments of the present disclosure.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, blocks 510-530 illustrated in FIG. 5 correspond to means-plus-function blocks 510A-530A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for saving power in a mobile device for wireless communication having a processor, comprising:

operating the processor with a clock frequency and a voltage when the mobile device is in a first Media Access Control (MAC) layer state;

transitioning to a second MAC layer state;

adjusting at least one of the clock frequency and the voltage of the processor when the mobile device is in the second state;

transitioning to a third MAC layer state; and adjusting at least one of the clock frequency and the voltage of the processor when the mobile device is in the third state such that the at least one of the clock frequency and the voltage is different than when in the first and the second states.

2. The method of claim 1, wherein the first state comprises a data exchange state and the second state comprises a power-saving state.

3. The method of claim 2, wherein adjusting the at least one of the clock frequency and the voltage of the processor comprises decreasing the clock frequency.

4. The method of claim 1, wherein the first state comprises a power-saving state and the second state comprises a data exchange state.

5. The method of claim 4, wherein adjusting the at least one of the clock frequency and the voltage of the processor comprises increasing the clock frequency.

6. The method of claim 1, wherein adjusting the at least one of the clock frequency and the voltage of the processor comprises reading a look-up table having the at least one of the clock frequency and the voltage for the second state.

7. The method of claim 1, wherein the first state comprises a synchronization state, the second state comprises a data exchange state, and the third state comprises a power-saving state.

8. A computer-program product for saving power in a mobile device for wireless communication having a processor, comprising a non-transitory computer-readable medium having instructions stored thereon, the instructions being executable by one or more processors and the instructions comprising:

instructions for operating the processor with a clock frequency and a voltage when the mobile device is in a first Media Access Control (MAC) layer state;

instructions for transitioning to a second MAC layer state;

instructions for adjusting at least one of the clock frequency and the voltage of the processor when the mobile device is in the second state;

instructions for transitioning to a third MAC layer state; and instructions for adjusting at least one of the clock frequency and the voltage of the processor when the mobile device is in the third state such that the at least one of the clock frequency and the voltage is different than when in the first and the second states.

9. The computer-program product of claim 8, wherein the first state comprises a data exchange state and the second state comprises a power-saving state.

10. The computer-program product of claim 9, wherein the instructions for adjusting the at least one of the clock frequency and the voltage of the processor comprise instructions for decreasing the clock frequency.

11. The computer-program product of claim 8, wherein the first state comprises a power-saving state and the second state comprises a data exchange state.

12. The computer-program product of claim 11, wherein the instructions for adjusting the at least one of the clock frequency and the voltage of the processor comprise instructions for increasing the clock frequency.

13. The computer-program product of claim 8, wherein the instructions for adjusting the at least one of the clock frequency and the voltage of the processor comprise instructions for reading a look-up table having the at least one of the clock frequency and the voltage for the second state.

14. The computer-program product of claim 8, wherein the first state comprises a synchronization state, the second state comprises a data exchange state, and the third state comprises a power-saving state.

15. An apparatus for wireless communication, comprising:
a processor;
means for operating the processor with a clock frequency and a voltage when the mobile device is in a first Media Access Control (MAC) layer state;
means for transitioning to a second MAC layer state;
means for adjusting at least one of the clock frequency and the voltage of the processor when the mobile device is in the second state;
means for transitioning to a third MAC layer state; and
means for adjusting at least one of the clock frequency and the voltage of the processor when the mobile device is in the third state such that the at least one of the clock frequency and the voltage is different than when in the first and the second states.

16. The apparatus of claim 15, wherein the first state comprises a data exchange state and the second state comprises a power-saving state.

17. The apparatus of claim 16, wherein the means for adjusting the at least one of the clock frequency and the voltage of the processor is configured to decrease the clock frequency.

18. The apparatus of claim 15, wherein the first state comprises a power-saving state and the second state comprises a data exchange state.

19. The apparatus of claim 18, wherein the means for adjusting the at least one of the clock frequency and the voltage of the processor is configured to increase the clock frequency.

20. The apparatus of claim 15, wherein the means for adjusting the at least one of the clock frequency and the voltage of the processor is configured to read a look-up table having the at least one of the clock frequency and the voltage for the second state.

21. The apparatus of claim 15, wherein the first state comprises a synchronization state, the second state comprises a data exchange state, and the third state comprises a power-saving state.

22. A mobile device, comprising:
a processor;
control logic configured to operate the processor with a clock frequency and a voltage when the mobile device is in a first Media Access Control (MAC) layer state; and
state logic configured to transition to a second MAC layer state, wherein the control logic is configured to adjust at least one of the clock frequency and the voltage of the processor when the mobile device is in the second state,
wherein the state logic is configured to transition to a third MAC layer state and wherein the logic for adjusting is configured to adjust at least one of the clock frequency and the voltage of the processor when the mobile device is in the third state such that the at least one of the clock frequency and the voltage is different than when in the first and the second states.

23. The mobile device of claim 22, wherein the first state comprises a data exchange state and the second state comprises a power-saving state.

24. The mobile device of claim 23, wherein the control logic is configured to decrease the clock frequency.

25. The mobile device of claim 22, wherein the first state comprises a power-saving state and the second state comprises a data exchange state.

26. The mobile device of claim 25, wherein the control logic is configured to increase the clock frequency.

27. The mobile device of claim 22, wherein the control logic is configured to read a look-up table having the at least one of the clock frequency and the voltage for the second state.

28. The mobile device of claim 22, wherein the first state comprises a synchronization state, the second state comprises a data exchange state, and the third state comprises a power-saving state.

* * * * *